(12) United States Patent  (10) Patent No.: US 9,245,679 B1
Termain                          (45) Date of Patent:      Jan. 26, 2016

(54) WINE BOTTLE FLOATATION DEVICE

(71) Applicant: Melvin A. Termain, Burbank, CA (US)

(72) Inventor: Melvin A. Termain, Burbank, CA (US)

( * ) Notice: Subject to any disclaimer, the term of this patent is extended or adjusted under 35 U.S.C. 154(b) by 0 days.

(21) Appl. No.: 14/501,224

(22) Filed: Sep. 30, 2014

(51) Int. Cl.
  *H01F 7/02* (2006.01)
  *H01F 7/06* (2006.01)
  *A47G 23/02* (2006.01)

(52) U.S. Cl.
  CPC .............. *H01F 7/06* (2013.01); *A47G 23/0241* (2013.01); *H01F 2007/062* (2013.01)

(58) Field of Classification Search
  CPC .............................. H01F 7/0236; H02N 15/00
  USPC .................................................. 335/286, 306
  See application file for complete search history.

(56) References Cited

U.S. PATENT DOCUMENTS

| | | | | |
|---|---|---|---|---|
| 3,196,566 A * | 7/1965 | Littlefield | ............... | G09F 19/12 335/295 |
| 4,901,456 A * | 2/1990 | Cotutsca | ............... | G09F 19/12 40/427 |
| 5,155,651 A * | 10/1992 | Yoda | ............... | G05D 3/12 219/648 |
| 5,182,533 A * | 1/1993 | Ritts | ............... | A63H 33/26 310/90.5 |
| 5,506,459 A * | 4/1996 | Ritts | ............... | A63H 1/00 310/90.5 |
| 5,692,329 A | 12/1997 | Tang | | |
| D397,376 S | 8/1998 | Hwang | | |
| 6,761,610 B2 * | 7/2004 | Fisher | ............... | A63H 33/26 335/306 |
| 7,110,236 B2 * | 9/2006 | Joachim | ............... | H04N 15/00 361/139 |
| D563,825 S | 3/2008 | Cash | | |
| 7,348,691 B2 | 3/2008 | Davis | | |
| 7,531,929 B2 * | 5/2009 | Tong | ............... | F16C 32/0408 310/90.5 |
| 7,671,712 B2 * | 3/2010 | Elliott | ............... | H01F 7/0236 335/209 |
| 8,149,079 B2 | 4/2012 | Kazadi | | |
| 8,258,663 B2 * | 9/2012 | Smoot | ............... | H02N 15/00 310/90.5 |
| 8,354,908 B2 * | 1/2013 | Jeon | ............... | G03F 7/703 310/179 |
| 8,717,129 B1 * | 5/2014 | Cash | ............... | G09F 19/12 335/306 |
| 2006/0154217 A1 * | 7/2006 | Pachler | ............... | G09B 27/08 434/131 |

* cited by examiner

*Primary Examiner* — Alexander Talpalatski
(74) *Attorney, Agent, or Firm* — Kyle A. Fletcher, Esq.

(57) ABSTRACT

The magnetic levitation assembly includes at least one electromagnet that is coupled to a support surface. A top coupler is positionable around a top of a beverage container. The top coupler is attracted to the at least one electromagnet. A bottom coupler is positionable on a bottom of the beverage container. The bottom coupler is repelled to the at least one electromagnet. The beverage container is levitated by magnetism via attraction to an electromagnet positioned above or repelled to an electromagnet positioned below a respective coupler.

20 Claims, 5 Drawing Sheets

WINE BOTTLE FLOATATION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of floatation devices, more specifically, wine bottle floatation devices.

SUMMARY OF THE INVENTION

An embodiment of the disclosure meets the needs presented above by generally comprising a pair of electromagnets each coupled to opposing support surfaces. A top coupler is positionable around a top of a beverage container. The top coupler is attracted to an associated one of the electromagnets. A bottom coupler is positionable on a bottom of the beverage container. The bottom coupler is repelled to an associated one of the electromagnets. The beverage container is levitated by magnetism via attraction to an electromagnet positioned above or repelled from an electromagnet positioned below a respective coupler.

An object of the invention is to provide a device that levitates a beverage container in the air.

These together with additional objects, features and advantages of the wine bottle floatation device will be readily apparent to those of ordinary skill in the art upon reading the following detailed description of presently preferred, but nonetheless illustrative, embodiments of the wine bottle floatation device when taken in conjunction with the accompanying drawings.

In this respect, before explaining the current embodiments of the wine bottle floatation device in detail, it is to be understood that the wine bottle floatation device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wine bottle floatation device.

It is therefore important that the claims be regarded as including such equivalent construction insofar as they do not depart from the spirit and scope of the wine bottle floatation device. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
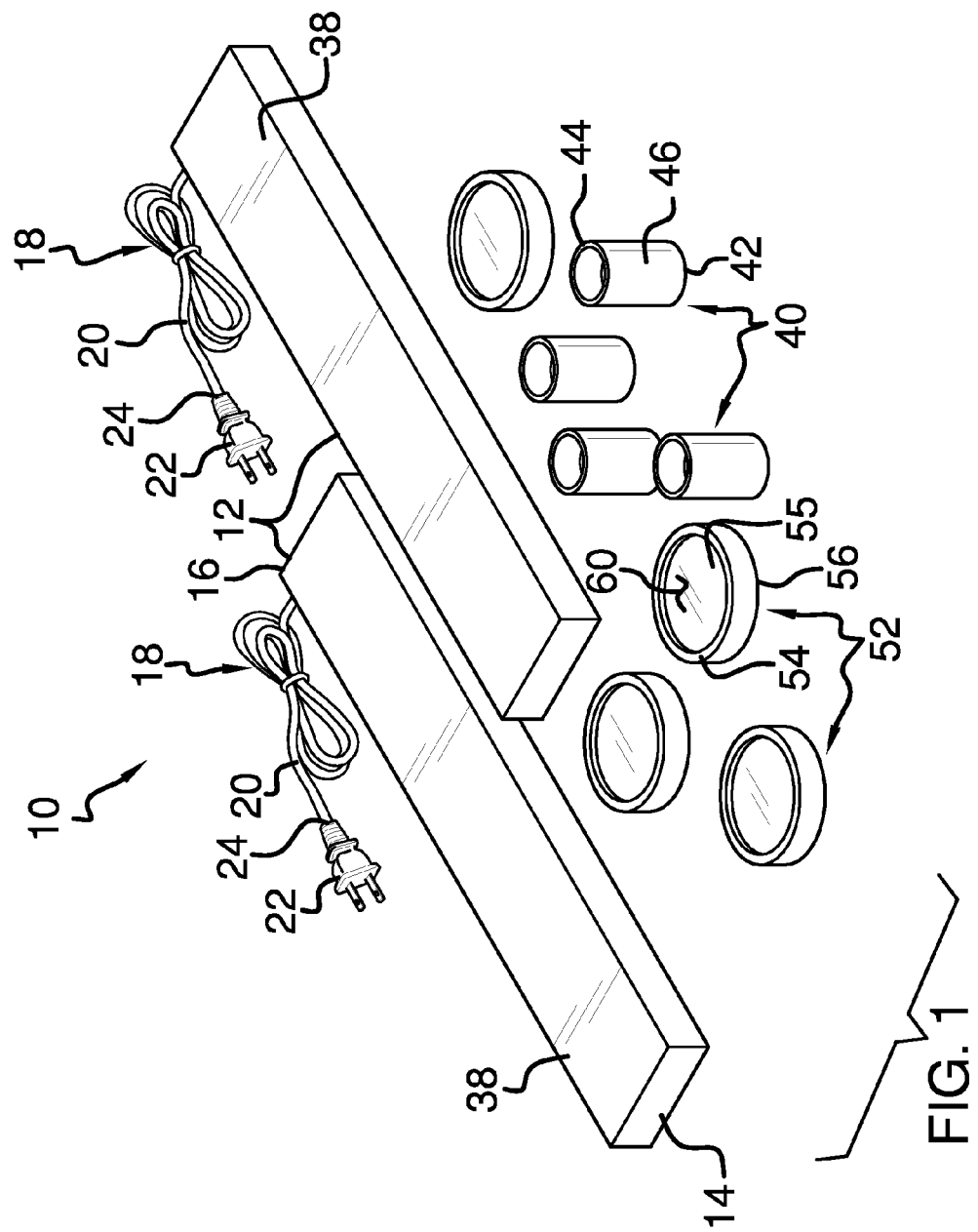
FIG. 1 is a perspective view of a magnetic levitation assembly according to an embodiment of the disclosure.
Figure 2:
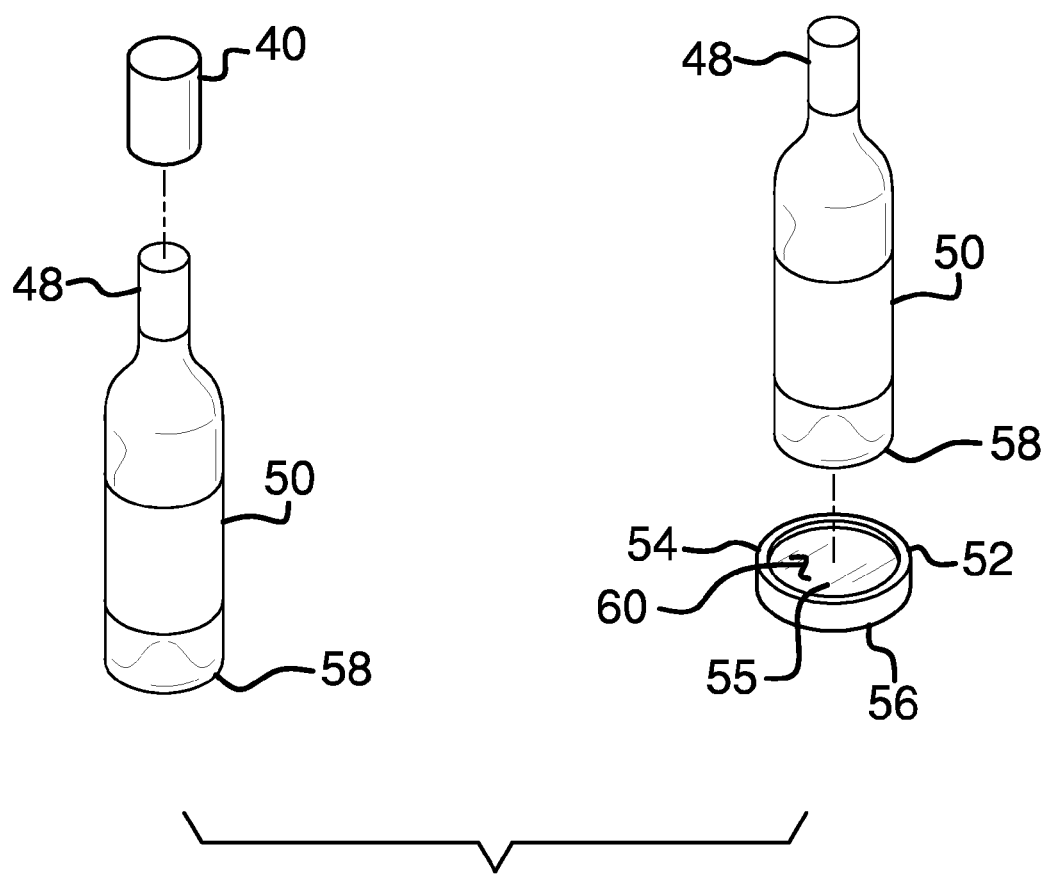
FIG. 2 is an exploded perspective view of differing embodiments of the disclosure.
Figure 3:
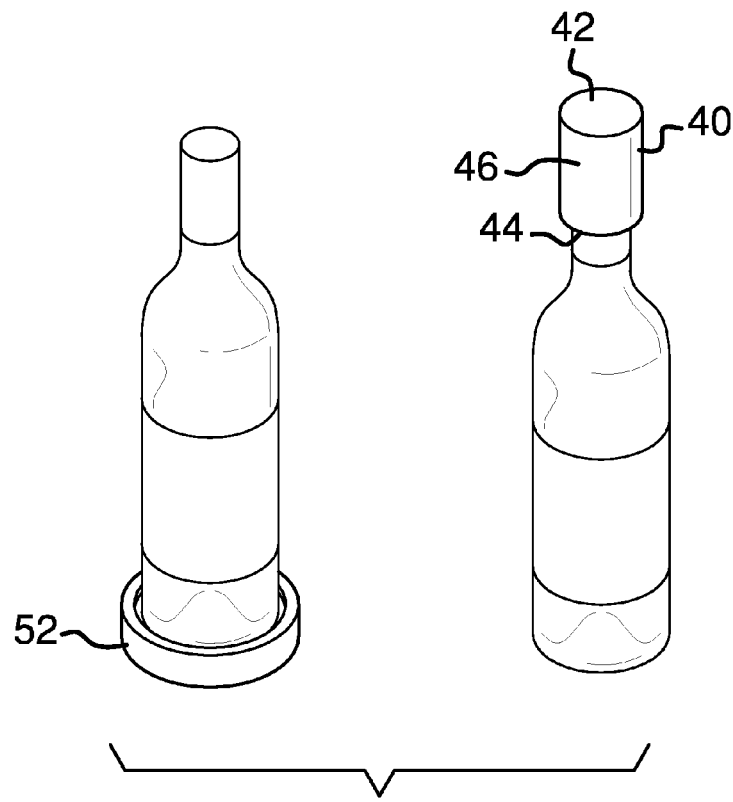
FIG. 3 is a top perspective view of differing embodiments of the disclosure.
Figure 4:
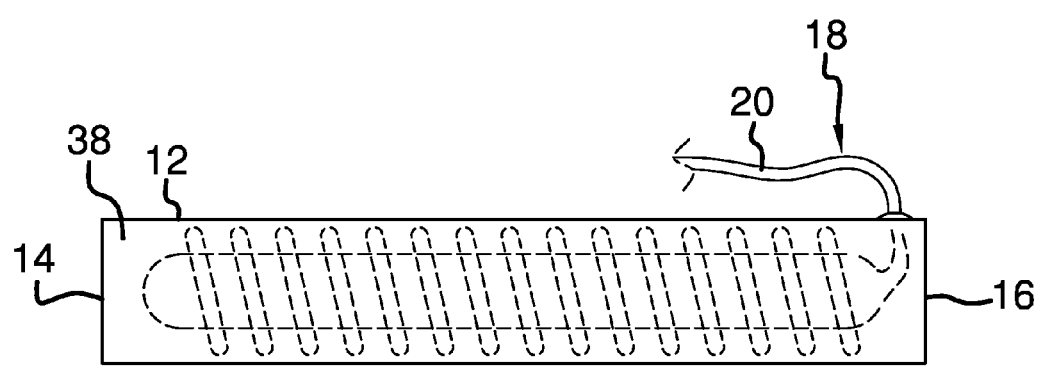
FIG. 4 is a top view of an embodiment of the disclosure.
Figure 5:
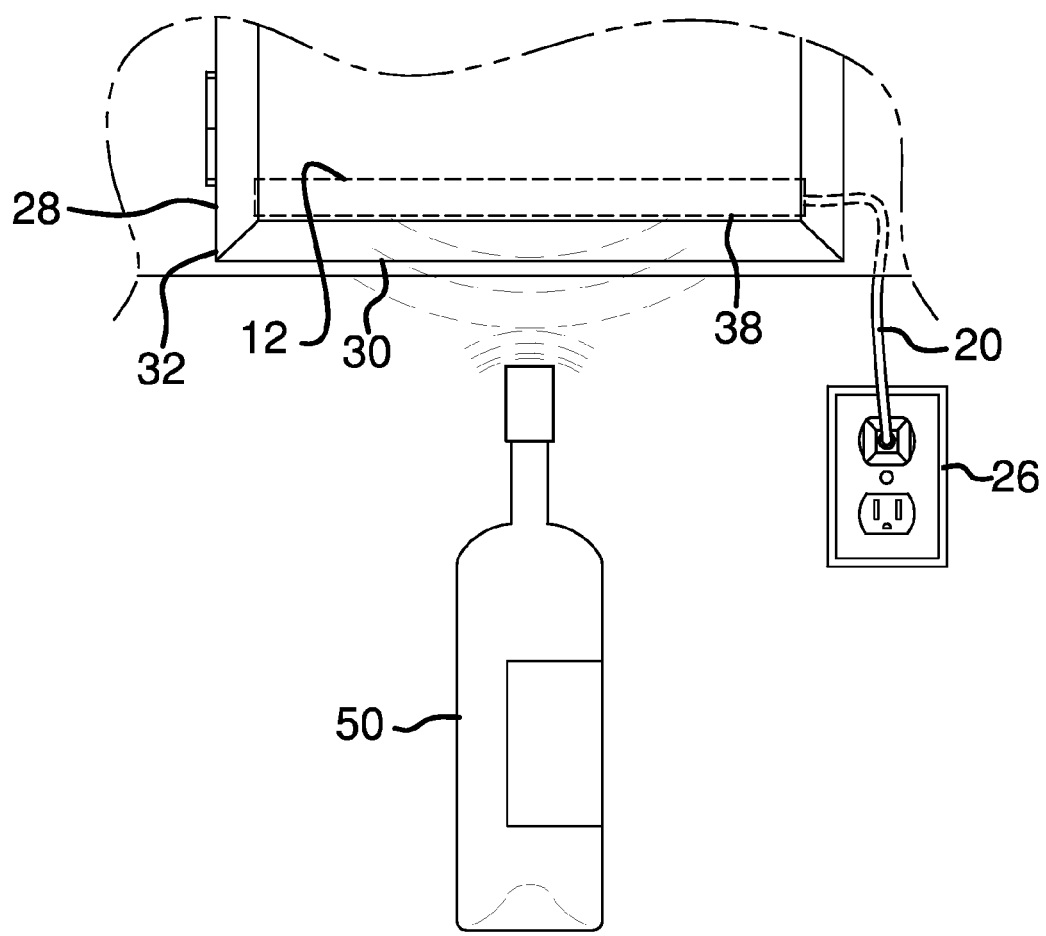
FIG. 5 is an in-use view of an embodiment of the disclosure.
Figure 6:
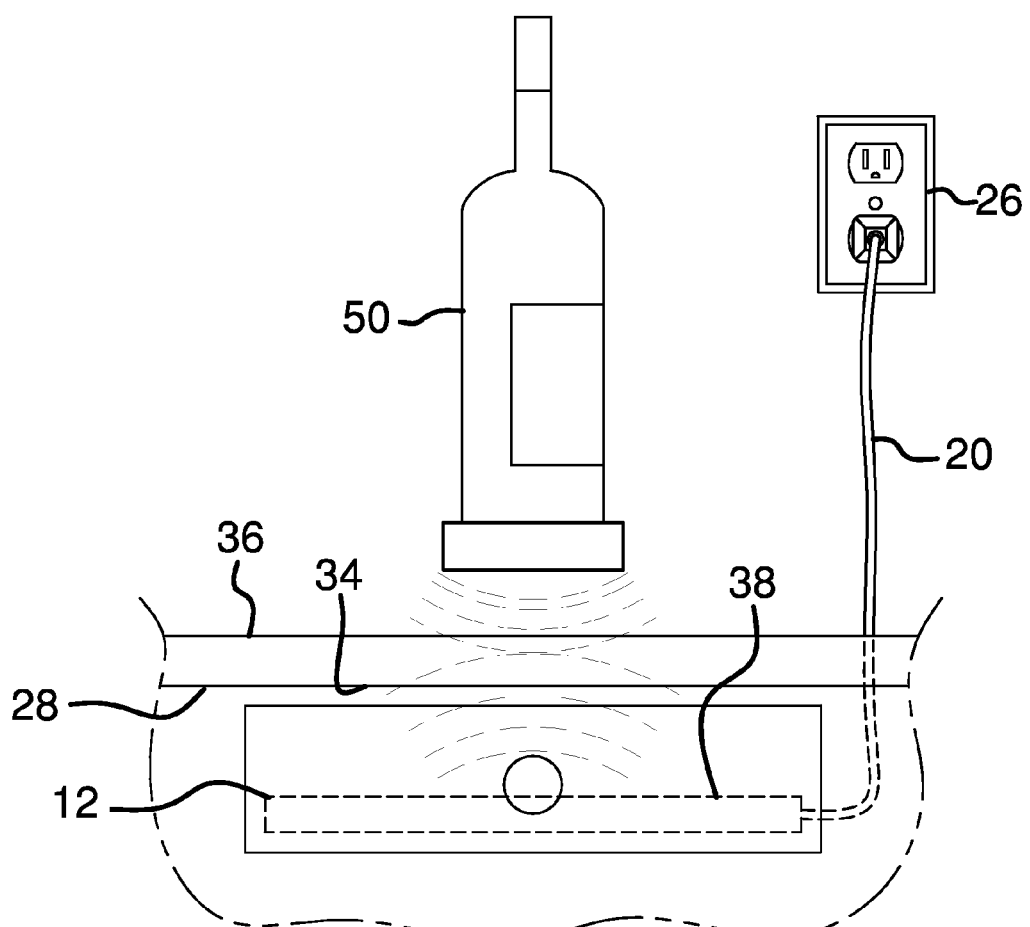
FIG. 6 is another in-use view of an embodiment of the disclosure.

As best illustrated in FIGS. 1 through 6, the magnetic levitation assembly 10 generally comprises a pair of electromagnets 12. Each of the pair of electromagnets 12 has a first end 14 and a second end 16. Moreover, each of the pair of electromagnets 12 may be elongated in shape. The pair of electromagnets 12 may each be an electromagnet of any conventional design. It shall be noted that only one of the pair of electromagnets 12 is used at any given time.

A pair of power supplies 18 is electrically coupled to an associated one of each of the pair of electromagnets 12. Each of the pair of power supplies 18 comprises a power cord 20 extending away from an associated one of the pair of electromagnets 12. A plug 22 is electrically coupled to a free end 24 of each of the pair of power supplies 18. Each of the pair of plugs 22 is selectively electrically coupled to a power source 26. The power source 26 may comprise an electrical outlet of any conventional design.

Each of the pair of electromagnets 12 is coupled to opposing support surfaces 28. The opposing support surfaces 28 may comprise a lowermost wall 30 of a cabinet 32 or a bottommost surface 34 of a counter top 36. One of the pair of electromagnets 12 is positioned against either the lowermost wall 30 of the cabinet 32 or the bottommost surface 34 of the counter top 36.

A top coupler 40 is provided. The top coupler 40 has a top end 42 and a bottom end 44 and the top coupler 40 is elongated. Moreover, the bottom end 44 of the top coupler 40 is open. The top coupler 40 is substantially hollow. Finally, the top coupler 40 may be comprised of a magnetic material.

An outer wall 46 of the top coupler 40 is curvilinear so the top coupler 40 has a cylindrical shape. The top coupler 40 is configured to be positioned around a neck 48 of a beverage container 50. The neck 48 of the beverage container 50 extends upwardly through the bottom end 44 of the top coupler 40. Additionally, the beverage container 50 may be a wine bottle of any conventional design. The top coupler 40 is one of a plurality of top couplers 40.

A bottom coupler 52 is provided. The bottom coupler 52 has a lip 54 extending upwardly from a bottom wall 55 of the bottom coupler 52. Moreover, the lip 54 is coextensive with an outer edge 56 of the bottom coupler 52. The outer edge 56 of the bottom coupler 52 is curvilinear so the bottom coupler 52 has a circular shape.

The bottom coupler 52 is positionable on a bottom end 58 of the beverage container 50. The bottom end 58 of the beverage container 50 abuts a top surface 60 of the bottom wall 55 of the bottom coupler 52. Additionally, the bottom coupler 52 may be comprised of a magnetic material. The bottom coupler 52 is one of a plurality of the bottom couplers 52.

The beverage container 50 is positionable above or below one of the pair of electromagnets 12 after either the top 40 or the bottom 52 coupler is positioned on or below the beverage container 50, respectively. The top coupler 40 is used to attract to one of the pair of electromagnets 12, which is affixed to the lowermost wall 30 of the cabinet 32.

Conversely, the bottom coupler 52 is repelled upwardly via one of the pair of electromagnets 12. One of the pair of electromagnets 12 that is affixed to the bottommost surface 34 of the counter top 36. The top 40 and bottom 52 couplers are either attracted to or repelled so the beverage container 50 is levitated in space.

In use, the pair of electromagnets 12 are each selectively positioned in an area where the beverage container 50 is to be stored or displayed. The pair of electromagnets 12 are each selectively positioned in a location that is highly visible so the beverage container 50 is displayed while being levitated in space. A plurality of the beverage containers 50 are stored using each of the plurality of top 40 and bottom 52 couplers in direct correlation to the positioning of the selected one of the pair of electromagnets 12. Moreover, the top couplers 40 are used where one of the pair of electromagnets 12 is position at the lowermost wall 30 of the cabinet 32. Conversely, the bottom couplers 52 are used where on of the pair of electromagnets 12 is positioned at the bottommost surface 34 of the counter top 36.

With respect to the above description, it is to be realized that the optimum dimensional relationship for the various components of the magnetic levitation assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the magnetic levitation assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An magnetic levitation assembly for levitating and storing a beverage container, said assembly comprising:
    at least one electromagnet is selectively coupled to a support surface;
    a top coupler being positionable around a top of the beverage container, said top coupler being attracted to the at least one electromagnet that is positioned to a support surface located above said beverage container; and
    a bottom coupler being positionable on a bottom of the beverage container, said bottom coupler being repelled by the at least one electromagnet such that the beverage container is levitated above the at least one electromagnet that is positioned to a support surface located below said beverage container.

2. The assembly according to claim 1 wherein the at least one electromagnet has a first end and a second end; wherein the at least one electromagnet is elongated.

3. The assembly according to claim 2 wherein a power supply is electrically coupled to the at least one electromagnet.

4. The assembly according to claim 3 wherein the power supply comprises a power cord extending away from the at least one electromagnet.

5. The assembly according to claim 4 wherein a plug is electrically coupled to a free end of the power supply; wherein the plug is electrically coupled to a power source.

6. The assembly according to claim 5 wherein the at least one electromagnet is coupled to the support surfaces; wherein the support surface comprises a lowermost wall of a cabinet or a bottommost surface of a counter top.

7. The assembly according to claim 6 wherein the at least one electromagnet is positioned against either the lowermost wall of the cabinet or the bottommost surface of the counter top.

8. The assembly according to claim 7 wherein the top coupler has a top end and a bottom end and the top coupler is elongated; wherein the bottom end of the top coupler is open; wherein the top coupler is constructed of a magnetic material.

9. The assembly according to claim 8 wherein an outer wall of the top coupler is curvilinear so the top coupler has a cylindrical shape; wherein the top coupler is configured to be positioned around a neck of said beverage container; wherein the neck of the beverage container extends upwardly through the bottom end of the top coupler; wherein the beverage container is a wine bottle of any conventional design.

10. The assembly according to claim 9 wherein the top coupler is one of a plurality of top couplers.

11. The assembly according to claim 9 wherein the bottom coupler has a lip extending upwardly from a bottom wall of the bottom coupler; wherein the lip is coextensive with an outer edge of the bottom coupler; wherein the outer edge of the bottom coupler is curvilinear so the bottom coupler has a circular shape.

12. The assembly according to claim 11 wherein the bottom coupler is positionable on a bottom end of the beverage container; wherein the bottom end of the beverage container abuts a top surface of the bottom wall of the bottom coupler; wherein the bottom coupler is comprised of a magnetic material.

13. The assembly according to claim 12 wherein the bottom coupler is one of a plurality of the bottom couplers.

14. The assembly according to claim 13 wherein the beverage container is positionable above or below the at least one electromagnet after either the top or the bottom coupler is positioned on the beverage container; wherein the top coupler is used to attract to the at least one electromagnet, which is affixed to the lowermost wall of the cabinet; wherein the bottom coupler is repelled upwardly via the at least one electromagnet; wherein the at least one electromagnet is affixed to the bottommost surface of the counter top.

15. An magnetic levitation assembly for levitating and storing a beverage container, said assembly comprising:
    at least one electromagnet is selectively coupled to a support surface;

a top coupler being positionable around a top of the beverage container, said top coupler being attracted to the at least one electromagnet that is positioned to a support surface located above said beverage container; and a bottom coupler being positionable on a bottom of the beverage container, said bottom coupler being repelled by the at least one electromagnet such that the beverage container is levitated above the at least one electromagnet that is positioned to a support surface located below said beverage container;

wherein the at least one electromagnet has a first end and a second end; wherein the at least one electromagnet is elongated;

wherein a power supply is electrically coupled to the at least one electromagnet;

wherein the power supply comprises a power cord extending away from the at least one electromagnet;

wherein a plug is electrically coupled to a free end of the power supply; wherein the plug is electrically coupled to a power source.

16. The assembly according to claim 5 wherein the at least one electromagnet is coupled to the support surfaces; wherein the support surface comprises a lowermost wall of a cabinet or a bottommost surface of a counter top; wherein the at least one electromagnet is positioned against either the lowermost wall of the cabinet or the bottommost surface of the counter top; wherein the top coupler has a top end and a bottom end and the top coupler is elongated; wherein the bottom end of the top coupler is open; wherein the top coupler is constructed of a magnetic material; wherein an outer wall of the top coupler is curvilinear so the top coupler has a cylindrical shape; wherein the top coupler is configured to be positioned around a neck of said beverage container; wherein the neck of the beverage container extends upwardly through the bottom end of the top coupler; wherein the beverage container is a wine bottle of any conventional design.

17. The assembly according to claim 16 wherein the top coupler is one of a plurality of top couplers.

18. The assembly according to claim 16 wherein the bottom coupler has a lip extending upwardly from a bottom wall of the bottom coupler; wherein the lip is coextensive with an outer edge of the bottom coupler; wherein the outer edge of the bottom coupler is curvilinear so the bottom coupler has a circular shape; wherein the bottom coupler is positionable on a bottom end of the beverage container; wherein the bottom end of the beverage container abuts a top surface of the bottom wall of the bottom coupler; wherein the bottom coupler is comprised of a magnetic material.

19. The assembly according to claim 18 wherein the bottom coupler is one of a plurality of the bottom couplers.

20. The assembly according to claim 18 wherein the beverage container is positionable above or below the at least one electromagnet after either the top or the bottom coupler is positioned on the beverage container; wherein the top coupler is used to attract to the at least one electromagnet, which is affixed to the lowermost wall of the cabinet; wherein the bottom coupler is repelled upwardly via the at least one electromagnet; wherein the at least one electromagnet is affixed to the bottommost surface of the counter top.

* * * * *